(12) United States Patent
Johnson

(10) Patent No.: US 7,475,389 B2
(45) Date of Patent: Jan. 6, 2009

(54) RESTORATION OF SOFTWARE CONFIGURATIONS

(75) Inventor: Donald Keith Johnson, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 10/334,865

(22) Filed: Dec. 31, 2002

(65) Prior Publication Data

US 2004/0128664 A1 Jul. 1, 2004

(51) Int. Cl.
*G06F 9/44* (2006.01)
(52) U.S. Cl. .................................................. 717/135
(58) Field of Classification Search ............... 717/168, 717/174
See application file for complete search history.

(56) References Cited

U.S. PATENT DOCUMENTS

| | | | | |
|---|---|---|---|---|
| 5,870,610 | A * | 2/1999 | Beyda | 717/173 |
| 5,958,063 | A | 9/1999 | Croslin et al. | 714/4 |
| 6,098,054 | A | 8/2000 | McCollom et al. | 705/59 |
| 2002/0035621 | A1 | 3/2002 | Zintel et al. | |
| 2002/0062404 | A1 | 5/2002 | Ecob et al. | |
| 2002/0090934 | A1 * | 7/2002 | Mitchelmore | 455/412 |
| 2002/0100036 | A1 * | 7/2002 | Moshir et al. | 717/173 |
| 2004/0015938 | A1 * | 1/2004 | Taylor | 717/168 |
| 2004/0103347 | A1 * | 5/2004 | Sneed et al. | 714/32 |

OTHER PUBLICATIONS

"Handbook for the Palm V™ Organizer", 1998, 3Com Corporation, excerpts.*
"Fundamentals of Fault-Tolerant Distributed Computing in Asynchronous Environments", Felix C. Gartner, ACM Computing Surveys, vol. 31, No. 1, Mar. 1999, pp. 1-26.

* cited by examiner

*Primary Examiner*—Wei Y. Zhen
*Assistant Examiner*—Philip R. Wang
(74) *Attorney, Agent, or Firm*—Steven L. Bennett, Esq.; Blanche E. Schiller, Esq.; Heslin Rothenberg Farley & Mesiti P.C.

(57) ABSTRACT

Software configurations of devices are automatically restored. One or more software components obtained for a device are automatically tracked. Those one or more software components tracked for the device are then automatically provided to the device to restore the software configuration of the device, in response to an indication that restoration is desired.

39 Claims, 6 Drawing Sheets

RESTORATION OF SOFTWARE CONFIGURATIONS

TECHNICAL FIELD

This invention relates, in general, to managing software configurations of devices, and in particular, to automatically restoring the software configuration of a device, in response to an event precipitating restoration.

BACKGROUND ART

Devices, such as console game systems, are increasing in complexity. Users are able to customize the devices, by adding to, deleting from, and/or modifying applications of the devices. The devices are becoming more programmable and are taking over more functions, which were previously performed by general purpose computers.

As the devices become more complex, however, they also become more susceptible to failure. When a failure of a device occurs, such as a software crash, the customization of the device may be wiped out. To obtain full function of the device again, the user has to painstakingly recreate the software configuration of the device. That is, the user needs to determine and re-install all the applications and patches that were previously on the device. This is burdensome and even overwhelming for some users, especially since these devices are typically targeted at technologically unsophisticated users.

Based on the foregoing, a need exists for a capability that facilitates restoration of software configurations of devices. As one example, a need exists for a capability that automatically restores software configurations of devices.

DISCLOSURE OF INVENTION

The shortcomings of the prior art are overcome and additional advantages are provided through the provision of a method of restoring software configurations of devices. The method includes, for instance, automatically tracking an obtaining of one or more software components of a device; and automatically restoring a software configuration of the device, the automatically restoring including automatically providing to the device the one or more software components that are tracked for that device.

In a further embodiment, a method of facilitating restoration of software configurations of devices is provided. The method includes, for instance, automatically tracking in a repository information relating to a software configuration of a device, the automatically tracking being responsive to changes to the software configuration; determining that the software configuration of the device is to be restored; and responsive to the determining, automatically providing to the device, based on information of the repository, one or more software components usable in restoring the software configuration.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Overview

Generally, in one aspect of the present invention, an automatic recovery capability is provided for devices, such as console game systems. When a device has a catastrophic software crash, all of the work a user has performed to customize that device can be wiped out. Thus, an automatic recovery capability is provided to recover the officially supported or registered software components (e.g., applications, patches and/or updates) of a device to be restored. Unofficial or unregistered, and perhaps faulty, software components, which may have been the cause of the original fault, are not recovered.

In one particular example, a repository associated with a device is automatically updated, in response to a user obtaining a software component for the device, via, for instance, the internet. Then, when the user's device suffers a failure and restoration is desired, the repository associated with the device is used to automatically obtain the registered software components for the device.

DETAILED DESCRIPTION

Figure 1:
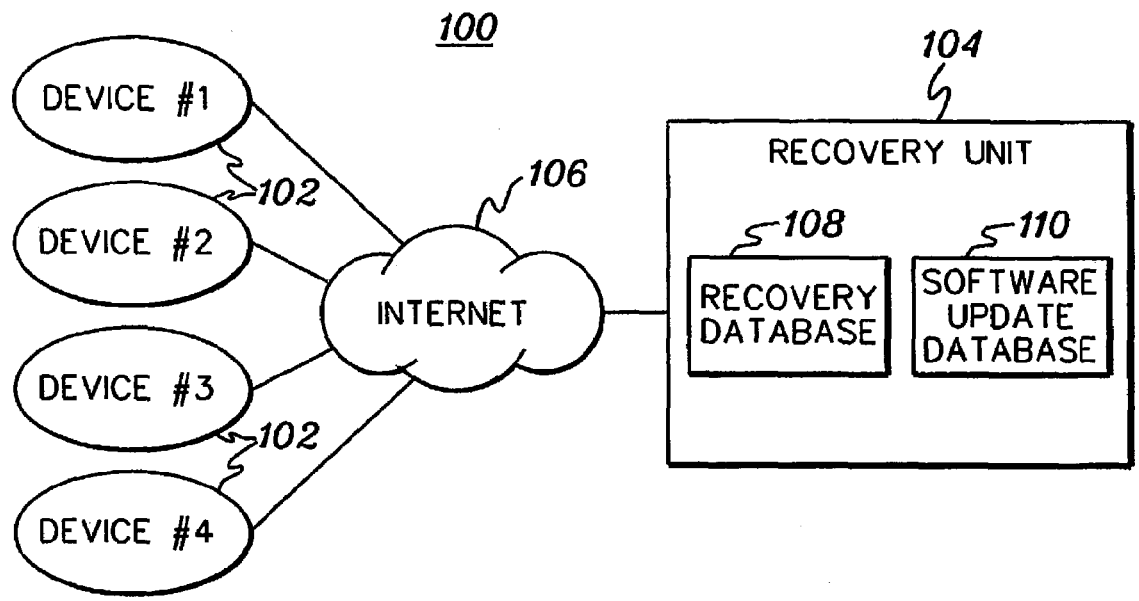
FIG. 1 depicts one embodiment of a distributed environment to incorporate and use one or more aspects of the present invention.

One embodiment of a distributed environment to incorporate and use one or more aspects of the present invention is described with reference to FIG. 1. A distributed environment 100 includes, for instance, one or more devices 102 coupled to one or more recovery units 104 via at least one internet network 106.

A device 102 is, for instance, a consumer device, such as a console game system, or other types of systems. A device includes an unique identifier, which is embedded in the hardware, as one example, so it is difficult for users to change the identification. Additionally, the identifier may contain some internal consistency coding to make it difficult for users, who do manage to change the identification, to choose a new valid identification. Further, a device includes, for instance, a factory installed back-up software configuration, which is installed on a reliable storage medium (e.g., NVRAM), and built-in recovery firmware. The firmware includes at least one program usable in recovery (e.g., a portion or full operating system implementation, and/or one or more other applications), which is stored in non-volatile storage (e.g., NVRAM, EEPROM, ROM, etc.). Further, the device includes an internet access application, an internet connection and/or a software update and recovery application that includes information (e.g., an IP address) on how to contact the recovery unit coupled to the device.

The devices are coupled to the internet via a dial-up modem, DSL, or other mechanisms, as examples. In one instance, communication between a device and its recovery unit are to take appropriate security precautions, so the parties to the communication (e.g., a device and recovery unit) are authenticated and messages are not intercepted, corrupted or otherwise tampered with by a third party.

Recovery unit 104 is, for instance, a server, such as a server based on the pSeries, xSeries or iSeries architecture, offered by International Business Machines Corporation, Armonk, N.Y. It is maintained by or on behalf of the manufacture of the one or more devices coupled to the recovery unit. The recovery unit includes, for example, a repository of one or more recovery databases 108, and one or more software update databases 110. Each recovery database includes information used to recover devices, as described in further detail herein, and each software update database includes information regarding available software for the devices. For example, the software update database indicates which software is for a particular hardware configuration, and/or which patch is associated with a particular version of a software application, etc.

The recovery unit is used to automatically restore the software configuration of a device. To facilitate this recovery, the recovery unit automatically tracks software components obtained for the various devices registered with the recovery unit. Examples of the type of information tracked during various stages of normal operation of a device are described with reference to FIGS. 2-4. For example, information tracked during initial installation of a device is described with reference to FIG. 2; information tracked during the obtaining of an application is described with reference to FIG. 3; and the information tracked during the obtaining of a software patch is described with reference to FIG. 4.

Figure 2:
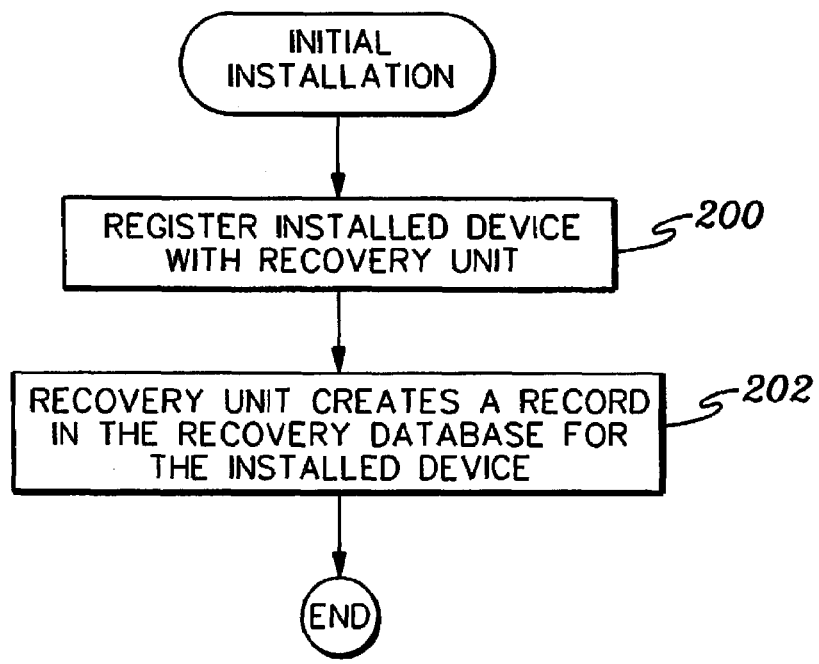
FIG. 2 depicts one embodiment of the logic associated with recording information relating to the initial installation of a device, in accordance with an aspect of the present invention.

Referring to FIG. 2, when a device is initially installed, it registers itself with recovery unit 104, STEP 200. This includes, for instance, providing the recovery unit with its unique id and its initial hardware and software configurations. The recovery unit then uses this information to create a record for the device in recovery database 108, STEP 202. The record includes, for instance, the identification of the device, its initial hardware configuration, and its initial software configuration (e.g., operating system and zero or more applications).

Subsequent to installation, one or more additional applications may be obtained (e.g., requested, provided, purchased, leased, licensed, downloaded, installed, etc.) for the device. Information recorded with this type of activity is described with reference to FIG. 3.

Initially, a determination is made as to whether the online obtaining of applications is supported, INQUIRY 300. If it is not supported, then processing is complete. However, if it is supported, then the device contacts the recovery unit, since, in one example, it is the recovery unit that controls the obtaining of requested applications, STEP 302. The procedure to obtain a requested application begins, STEP 304.

In one example, the recovery unit looks at which application is being requested, and checks the software and hardware configuration information for the device to provide the correct version of the application for that software/hardware configuration, STEP 306. For instance, the recovery unit checks the record in the recovery database for that device to determine the hardware/software configuration of the device. Then, it checks the software update database to determine the appropriate version of the requested application for that configuration. This version of the application is then provided (e.g., downloaded via the internet) to the device.

In response to receiving the application, the device installs the application in a standard manner, STEP 308. (In a further example, the recovery unit installs the application.) Additionally, the recovery unit records information relating to this action in the recovery database, STEP 310. As one example, it records an indication of the requested application, including an indication of which version of that application was provided.

In addition to obtaining applications, it is also possible to obtain a software patch or other type of update. Typically, patches are used to correct any errors or to enhance a particular feature. One embodiment of the logic associated with recording information for a software patch is described with reference to FIG. 4.

Initially, the device contacts the recovery unit for one or more software patches, STEP 400. It may be that a specific patch is requested or a request is made for any appropriate patches for the hardware/software configuration of the device. The recovery unit uses a software patch procedure to determine which software patches the device is to receive, STEP 402. For example, the recovery unit checks the recovery database to determine the hardware/software configuration of the device, and then checks the software update database to determine whether there are any patches for that configuration or whether the requested patch is appropriate.

In response to the checking, zero or more software patches are downloaded by the recovery unit to the device, and installed by either the recovery unit or the device, STEP 404. Additionally, the recovery unit records in the recovery database the software patches that were provided to the device, STEP 406.

Based on the foregoing, during normal operation, information is automatically tracked and saved in the recovery database, which is used in case recovery of a software configuration of a device is needed. The above processes update the recovery database's configuration information for a device, as individual updates are made. In general, with this type of process, it is possible to have some drift, where the recorded configuration may drift away from the actual configuration. There are several failures which can cause this to happen, including, for instance, errors that occur during the download that might cause the recovery unit and device to have different views on whether a download succeeded; or a failure on the recovery unit may cause an old recovery database to be loaded resulting in some device updates being lost; etc.

Regardless of the cause, it may be desirous to periodically verify that the actual configuration is in fact recorded in the recovery database. This configuration synchronization may be done as a part of the above update procedures, in which each time an update is performed, the entire configuration is checked, or it may be performed as an independent operation.

Figure 5:
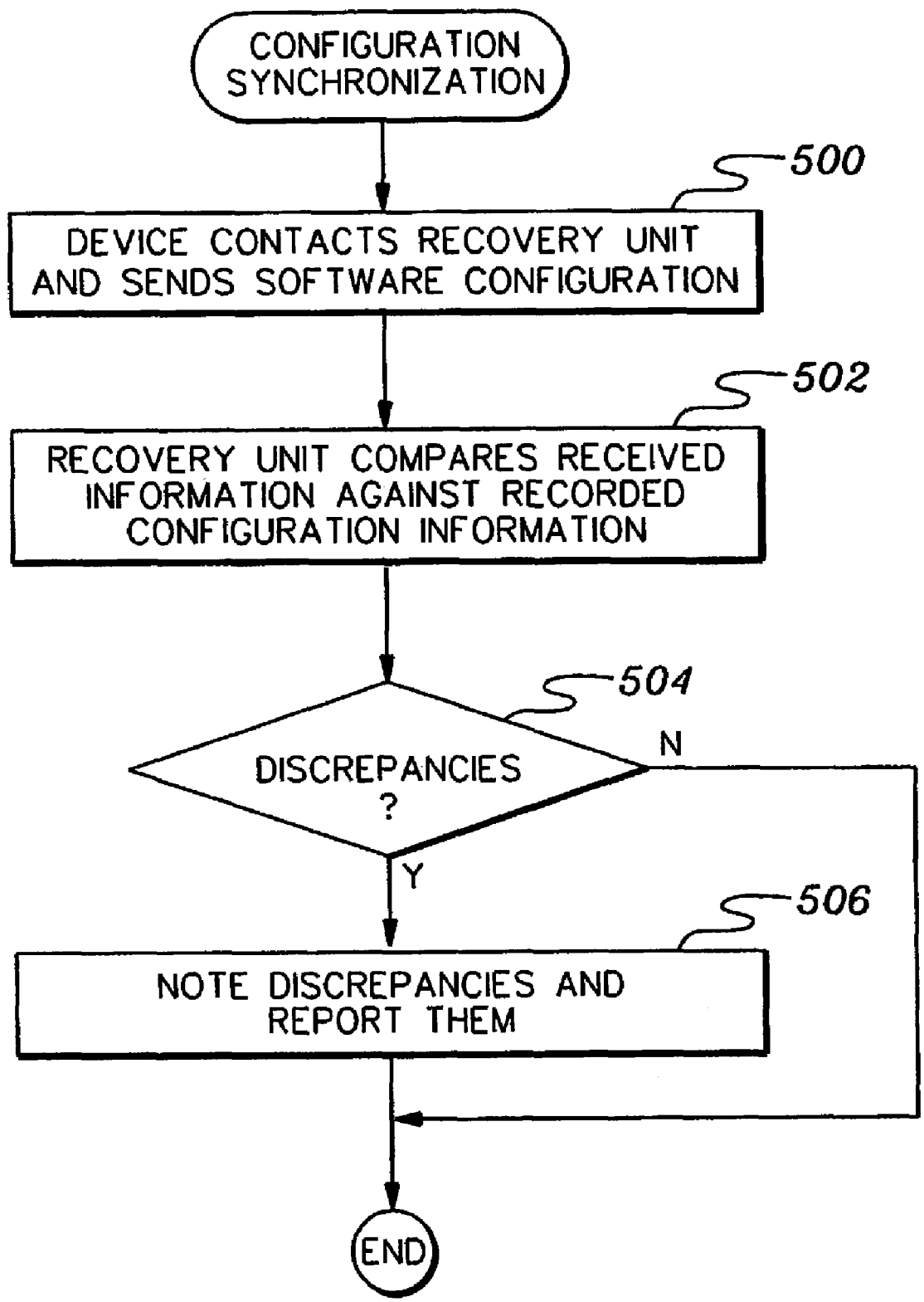
FIG. 5 depicts one embodiment of the logic associated with synchronizing the software configuration of the device with the recorded information of that device, in accordance with an aspect of the present invention.

One embodiment of the logic associated with this optional periodic configuration synchronization is described with reference to FIG. 5.

The device contacts the recovery unit and sends its software configuration information to the recovery unit, STEP 500. This includes, for example, information regarding the operating system, applications, patches and/or other updates. The recovery unit compares the received information against the recorded configuration information for that device to determine whether there are any discrepancies, STEP 502. If there are discrepancies, INQUIRY 504, then those discrepancies are noted and reported back to the device, STEP 506. Any noted and reported discrepancies can be addressed by either the recovery unit's administrator or the user of the device. However, if there are no discrepancies, processing is complete.

The tracking of the software components (e.g., applications, patches, updates) for a particular device enables that device to be restored, if desired. In one example, a device is restored, in response to detecting a catastrophic software failure. The definition of what is a catastrophic software failure is implementation dependent. For example, a catastrophic software failure may be indicated, when the device fails to boot a predefined number of times (e.g., four times in a row) or within a timeout range. As a further example, a catastrophic software failure may be indicated when a user's favorite application will not start.

Regardless of the definition of a catastrophic software failure, recovery is initiated in response thereto. The initiation of recovery may be manual or automatic. For example, a user may manually start the process or the device may automatically go into recovery, when recovery is indicated. Notwithstanding how the process is started, the recovery itself is automatic, in accordance with an aspect of the present invention.

Figure 6A:
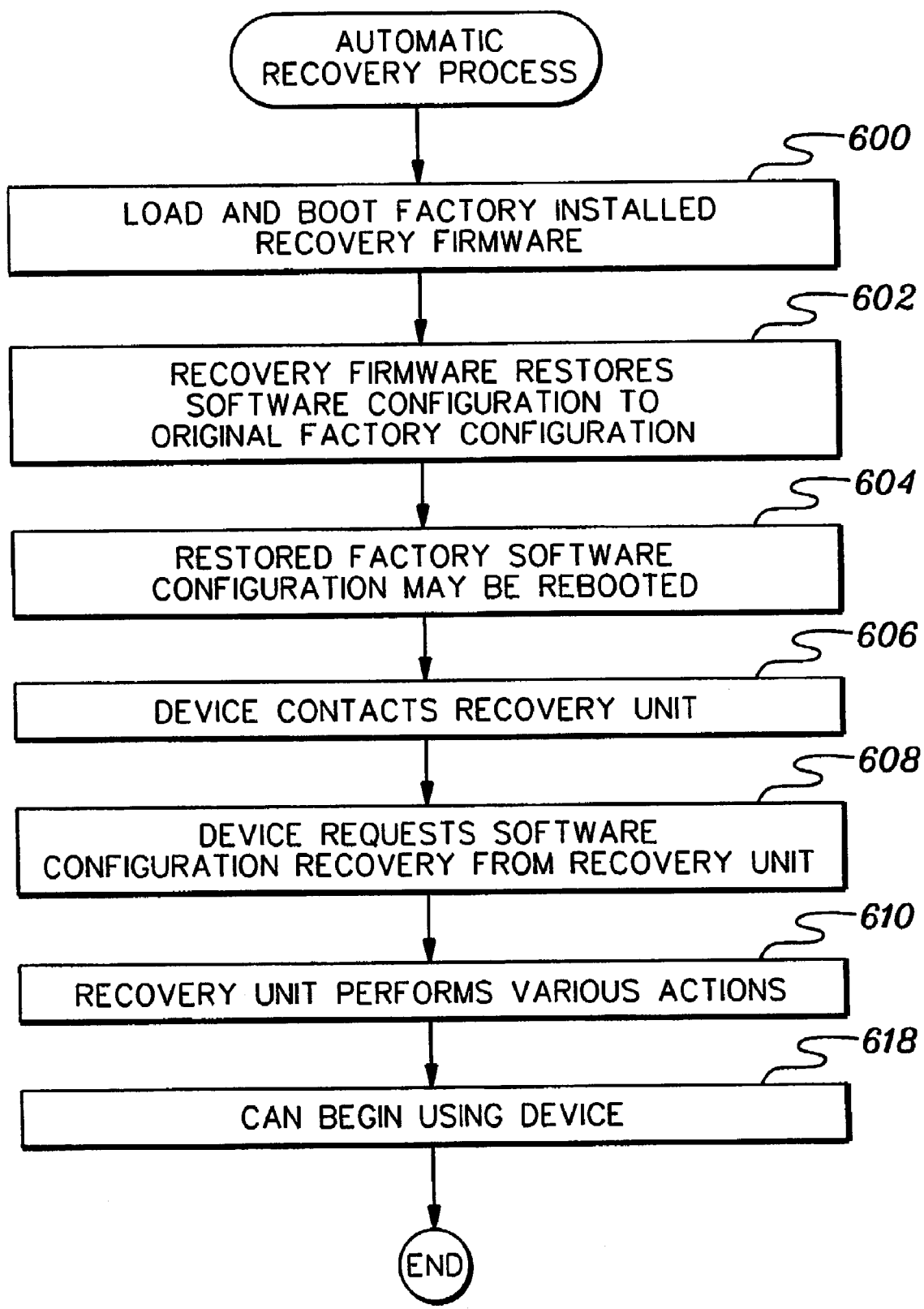
FIG. 6a depicts one embodiment of the logic associated with automatically recovering a software configuration of a device, in accordance with an aspect of the present invention.
Figure 6B:
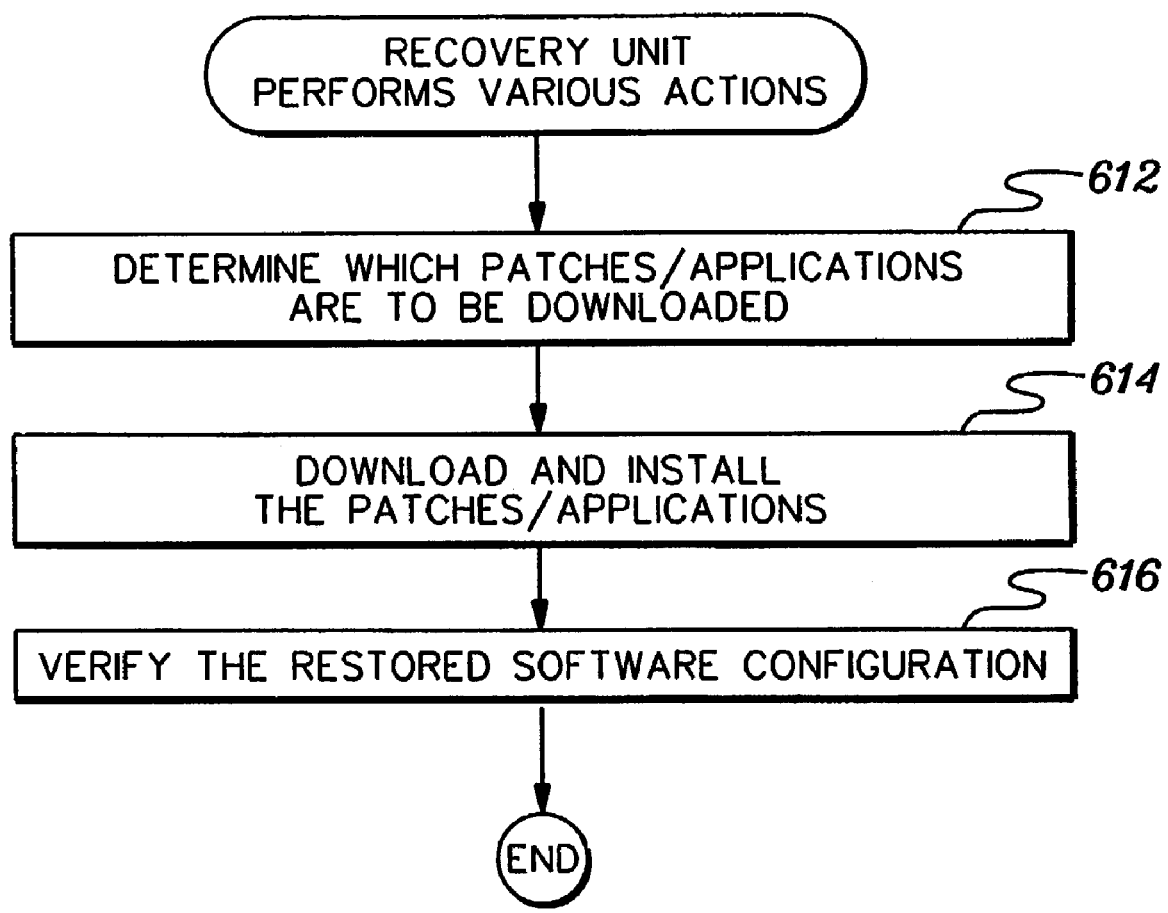
FIG. 6b depicts one embodiment of various actions taken by a recovery unit in the automatic recovery capability of FIG. 6a, in accordance with an aspect of the present invention.

One embodiment of the logic associated with the automatic recovery process is described with reference to FIGS. 6a-6b. When the automatic recovery process is initiated, the device loads and boots the factory installed recovery firmware, STEP 600. The recovery firmware restores the device's software configuration to its original factory software configuration, STEP 602. For example, the recovery firmware reads the original software configuration from a storage device (e.g., NVRAM) embedded in the device or asks the user for a factory supplied recovery media (e.g., CD-ROM) from which it can read the original factory installed software configuration. The restored factory software configuration is then rebooted, STEP 604.

The device connects to the internet and contacts the recovery unit, STEP 606. The device then requests software configuration recovery from the recovery unit, STEP 608. Using the device's software configuration, as identified by the device's unique id recorded in the recovery database, the recovery unit performs various actions to recover the device, STEP 610. These actions include, for instance, determining which software components are to be provided to the device to restore the device to its registered state (i.e., its state prior to failure that includes the registered software components of the device), STEP 612 (FIG. 6b). It should be noted that in some extreme cases, a patch may involve downloading a new operating system image; however, this should be avoided.

Subsequently, the software components are downloaded and installed, STEP 614. In one example, each component is downloaded and installed by the recovery unit, one at a time. As further examples, the device may do the install, one at a time, or it may be possible to batch download the components and have the device batch install them.

Thereafter, the restored software configuration is verified, STEP 616. In one example, the recovery unit checks that the restored software configuration matches the configuration recorded in the recovery database. In response to verifying that the software configuration matches the recovery database, the automatic recovery process is complete, and the user is able to start using the device again, STEP 618 (FIG. 6a). In one example, if the verification indicates a discrepancy, then the discrepancy is reported to the device.

Advantages

Described in detail above is an automatic recovery capability that automatically restores a device to its registered state, in response to an indication that recovery is desired. Advantageously, the recovery capability enables a device to be recovered, without requiring users to painstakingly recreate the device. Further, the capability is usable for devices owned by technologically unsophisticated users. It allows those users to enjoy their devices without learning how to restore them.

Alternate Embodiments

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

For example, one or more recovery units may be maintained by or on behalf of various device providers (e.g., manufacturers). A recovery unit can be any component that can connect to the internet, maintain a database and respond to requests. Further, the mechanism coupling the devices and the one or more recovery units may be other than the internet.

There are various embodiments for the recovery unit. For example, for a particular device provider and a particular device, there may be one recovery unit that services that device, and each time the device wants to request another software component or be restored, it contacts that recovery unit. As a further example, there are a distributed set of recovery units that are maintained in synchronization, so any one of those units may be contacted.

The information tracked by the recovery unit may include additional, less or different information than that described herein. Further, a unit other than the recovery unit may control the obtaining of a software component, as long as the recovery unit is provided information regarding the obtaining, such that the appropriate information can be tracked.

As a further example, the recovery process can be implemented in many different ways. For example, the firmware can load a memory resident operating system, which then installs the original software configuration, including a full operating system. Other changes are also possible.

Although an example of a device has been provided herein, many types of devices may be used. Those devices are to include, for instance, recovery firmware, internet access, and/or information to access the recovery unit, etc. As examples, a device may be a computer system or other consumer-type devices.

Additionally, although examples of architectures and distributed environments have been provided, these are only examples. Other architectures and/or distributed environments may be used.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Figure 3:
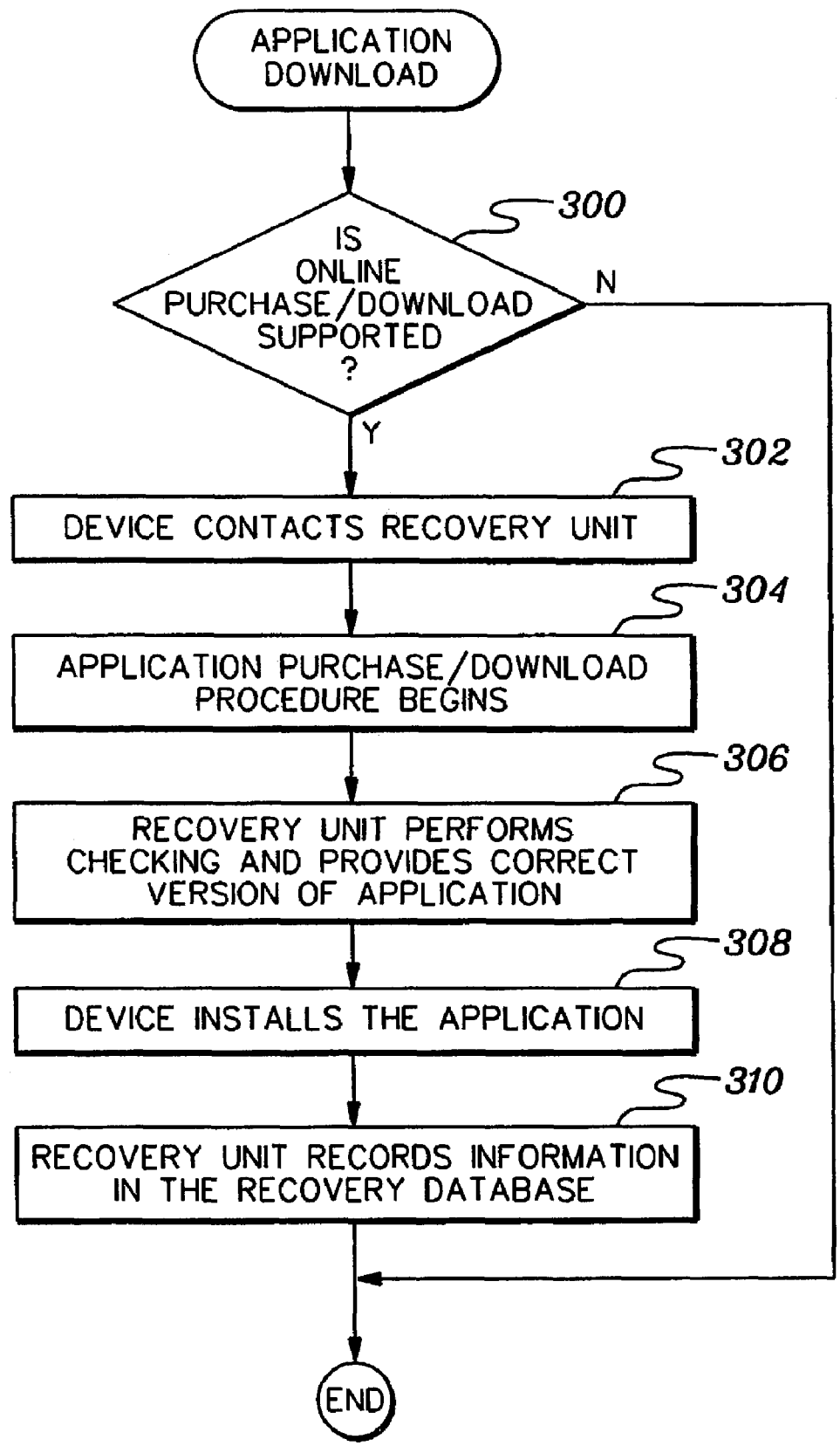
FIG. 3 depicts one embodiment of the logic associated with recording information relating to the installation of an application on the device, in accordance with an aspect of the present invention.
Figure 4:
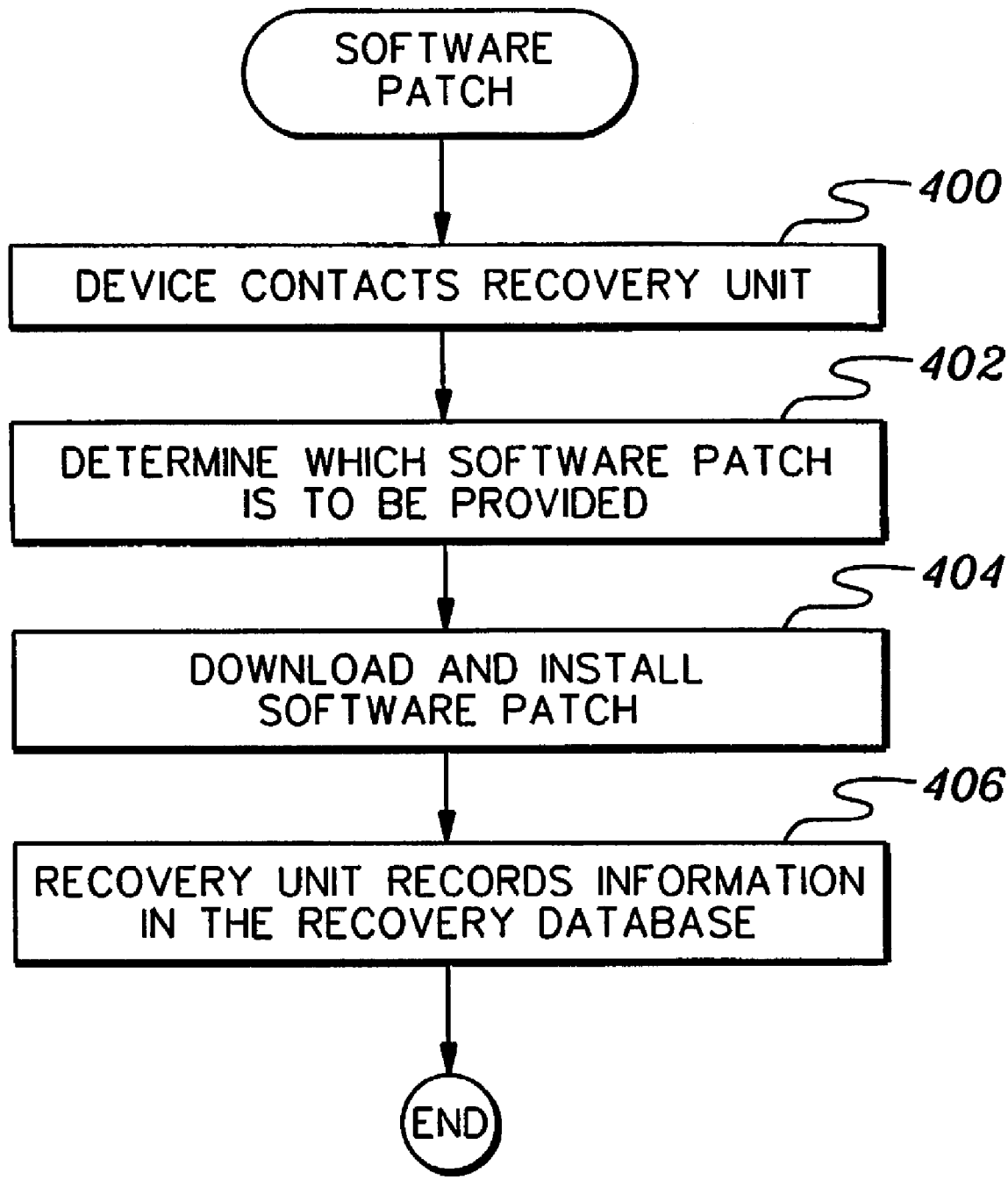
FIG. 4 depicts one embodiment of the logic associated with recording information relating to the installation of a software patch on the device, in accordance with an aspect of the present invention.

For example, in FIG. 3, on the "No" path, some action may be taken, such as providing a message that online obtaining of applications is not supported. Similarly, in FIG. 5, action may be taken on the "No" path, such as providing a message. As yet a further example, in STEP 500 of FIG. 5, other information, such as hardware configuration information, can be provided from the device to the recovery unit.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

What is claimed is:

1. A method of restoring software configurations of devices, said method comprising:
   automatically tracking an obtaining of a software component for a device, the software component being obtained subsequent to installation of an initial software configuration of the device, and wherein the automatically tracking comprises automatically registering, responsive to the obtaining, the software component with a hardware identifier of the device to associate the software component with the particular device, said hardware identifier being automatically provided by the device, absent user intervention;
   automatically restoring a software configuration of the device, said automatically restoring comprising automatically identifying the device to be restored via the hardware identifier and automatically providing to the device the software component registered to the hardware identifier of the device;
   automatically determining, absent user intervention, at least one of a patch and an update pertaining to the software configuration of the device to be provided to the device;
   automatically providing, responsive to the automatically determining, at least one of the patch and the update to the device; and
   wherein said automatically tracking automatically tracks information of the at least one of the patch and the update for the device by employing the hardware identifier.

2. The method of claim 1, wherein the automatically restoring comprises:
   automatically determining the software component registered for the device; and
   automatically providing the software component to the device, absent user intervention, in response to the automatically determining.

3. The method of claim 1, wherein the software component comprises one of application and a software patch.

4. The method of claim 1, wherein the automatically restoring further comprises installing the software component on an original configuration of the device to restore the software configuration to a recorded state of the device.

5. The method of claim 4, further comprising using recovery firmware of the device to provide the original configuration of the device.

6. The method of claim 4, wherein the automatically restoring further comprises verifying the software configuration.

7. The method of claim 1, wherein the automatically tracking comprises storing information regarding the software component in a repository associated with the device, said information being coupled to the device by the hardware identifier of the device.

8. The method of claim 1, wherein the software component is provided electronically.

9. The method of claim 1, further comprising initially providing to the device the software component to be tracked, wherein the initially providing comprises automatically determining a version of the software component to be provided.

10. The method of claim 9, wherein the automatically determining the version comprises using data in a repository to determine the version, said data comprising at least one of the hardware identifier, information relating to the software configuration of the device and information relating to a hardware configuration of the device.

11. The method of claim 1, wherein the device comprises a consumer device.

12. The method of claim 11, wherein the consumer device comprises a game console.

13. The method of claim 1, further comprising:
   automatically detecting a failure of the device; and
   automatically initiating recovery of the device, responsive to the automatic detecting, said recovery comprising the automatically restoring.

14. A method of facilitating restoration of software configurations of devices, said method comprising:
   automatically providing to a recovery unit, by a device, an identifier of the device, said automatically providing being absent user intervention;
   providing, by the recovery unit, a software component requested by the device, the device requesting the software component subsequent to installation of an initial software configuration of the device;
   automatically tracking by the recovery unit, in response to the providing, information relating to the provided software component, said automatically tracking being absent user request and user intervention;
   automatically determining, by the recovery unit, that the software configuration of the device is to be restored;
   responsive to the automatically determining, automatically providing to the device by the recovery unit, based on the tracked information and the identifier, one or more software components usable in restoring the software configuration, the one or more software components including the requested software component; and
   wherein the providing the software component recjuested by the device comprises automatically determining by the recovery unit an appropriate version of the software component to be provided, said automatically determining the appropriate version comprising taking into consideration at least one of the software configuration and a hardware configuration of the device.

15. The method of claim 14, wherein the automatically providing the one or more software components comprises automatically determining based on the tracked information and the identifier an appropriate version of the one or more software components to be used in restoring the software configuration.

16. The method of claim 14, wherein the requested software component is other than a software component of an original factory installed configuration of the device.

17. A system of restoring software configurations of devices, said system comprising:
> means for automatically tracking an obtaining of a software component for a device, the software component being obtained subsequent to installation of an initial software configuration of the device, and wherein the means for automatically tracking comprises means for automatically registering, responsive to the obtaining, the software component with a hardware identifier of the device to associate the software component with the particular device, said hardware identifier being automatically provided by the device, absent user intervention;
> means for automatically restoring a software configuration of the device, said means for automatically restoring comprising means for automatically identifying the device to be restored via the hardware identifier and automatically providing to the device the software component registered to the hardware identifier of the device;
> means for automatically determining, absent user intervention, at least one of a patch and an update pertaining to the software configuration of the device to be provided to the device;
> means for automatically providing, responsive to the automatically determining, at least one of the patch and the update to the device; and
> wherein said means for automatically tracking automatically tracks information of the at least one of the patch and the update for the device by employing the hardware identifier.

18. The system of claim 17, wherein the means for automatically restoring comprises:
> means for automatically determining the software component registered for the device; and
> means for automatically providing the software component to the device, absent user intervention, in response to the automatically determining.

19. The system of claim 17, wherein the software component comprises one of an application and a software patch.

20. The system of claim 17, wherein the means for automatically restoring further comprises means for installing the software component on an original configuration of the device to restore the software configuration to a recorded state of the device.

21. The system of claim 20, further comprising means for using recovery firmware of the device to provide the original configuration of the device.

22. The system of claim 20, wherein the means for automatically restoring further comprises means for verifying the software configuration.

23. The system of claim 17, wherein the means for automatically tracking comprises means for storing information regarding the software component in a repository associated with the device, said information being coupled to the device by the hardware identifier of the device.

24. The system of claim 17, further comprising means for initially providing to the device the software component to be tracked, wherein the means for initially providing comprises means for automatically determining a version of the software component to be provided.

25. The system of claim 24, wherein the means for determining comprises means for using data in a repository to determine the version, said data comprising at least one of the hardware identifier, information relating to the software configuration of the device and information relating to a hardware configuration of the device.

26. A system of facilitating restoration of software configurations of devices, said system comprising:
> means for automatically providing to a recovery unit, by a device, an identifier of the device, the automatically providing being absent user intervention;
> means for providing, by the recovery unit, a software component requested by the device, the device requesting the software component subsequent to installation of an initial software configuration of the device;
> means for automatically tracking by the recovery unit, in response to the providing, information relating to the provided software component, the automatically tracking being absent user request and user intervention;
> means for automatically determining, by the recovery unit, that the software configuration of the device is to be restored;
> responsive to the automatically determining, means for automatically providing to the device by the recovery unit, based on the tracked information and the identifier, one or more software components usable in restoring the software configuration, the one or more software components including the requested software component; and
> wherein the means for providing the software component reciuested by the device comprises means for automatically determining by the recovery unit an appropriate version of the software component to be provided, said automatically determining the appropriate version comprising taking into consideration at least one of the software configuration and a hardware configuration of the device.

27. The system of claim 26, wherein the means for automatically providing the one or more software components comprises means for automatically determining based on the tracked information and the identifier an appropriate version of the one or more software components to be used in restoring the software configuration.

28. A system of restoring software configurations of devices, said system comprising:
> a processor:
> a recovery unit to automatically track an obtaining of a software component for a device, the software component being obtained subsequent to installation of an initial software configuration of the device, and wherein the automatically tracking comprises automatically registering, responsive to the obtaining, the software component with a hardware identifier of the device to associate the software component with the particular device, said hardware identifier being automatically provided by the device, absent user intervention;
> the recovery unit to automatically restore a software configuration of the device, the automatically restoring comprising automatically identifying the device to be restored via the hardware identifier and automatically providing to the device the software component registered to the hardware identifier of the device;
> the recovery unit to automatically determine, absent user intervention, at least one of a patch and an update pertaining to the software configuration of the device to be provided to the device;
> the recovery unit to automatically provide, responsive to the automatically determining, at least one of the patch and the update to the device; and
> wherein the automatically tracking automatically tracks information of the at least one of the patch and the update for the device by employing the hardware identifier.

29. At least one program storage device readable by a machine, tangibly embodying at least one program of instructions executable by the machine to perform a method of restoring software configurations of devices, said method comprising:

automatically tracking an obtaining of a software component for a device, the software component being obtained subsequent to installation of an initial software configuration of the device, and wherein the automatically tracking comprises automatically registering, responsive to the obtaining, the software component with a hardware identifier of the device to associate the software component with the particular device, said hardware identifier being automatically provided by the device, absent user intervention;

automatically restoring a software configuration of the device, said automatically restoring comprising automatically identifying the device to be restored via the hardware identifier and automatically providing to the device the software component registered to the hardware identifier of the device;

automatically determining, absent user intervention, at least one of a patch and an update pertaining to the software configuration of the device to be provided to the device;

automatically providing, responsive to the automatically determining, at least one of the patch and the update to the device; and wherein said automatically tracking automatically tracks information of the at least one of the patch and the update for the device by employing the hardware identifier.

30. The at least one program storage device of claim 29, wherein the automatically restoring comprises:

automatically determining the software component registered for the device; and automatically providing the software component to the device, absent user intervention, in response to the automatically determining.

31. The at least one program storage device of claim 29, wherein the automatically restoring further comprises installing the software component on an original configuration of the device to restore the software configuration to a recorded state of the device.

32. The at least one program storage device of claim 31, wherein said method further comprises using recovery firmware of the device to provide the original configuration of the device.

33. The at least one program storage device of claim 31, wherein the automatically restoring further comprises verifying the software configuration.

34. The at least one program storage device of claim 29, wherein the automatically tracking comprises storing information regarding the software component in a repository associated with the device, said information being coupled to the device by the hardware identifier of the device.

35. The at least one program storage device of claim 29, wherein said method further comprises initially providing to the device the software component to be tracked, wherein the initially providing comprises automatically determining a version of the software component to be provided.

36. The at least one program storage device of claim 35, wherein the automatically determining comprises using data in a repository to determine the version, said data comprising at least one of the hardware identifier, information relating to the software configuration of the device and information relating to a hardware configuration of the device.

37. At least one program storage device readable by a machine, tangibly embodying at least one program of instructions executable by the machine to perform a method of facilitating restoration of software configurations of devices, said method comprising:

automatically providing to a recovery unit, by a device, an identifier of the device, said automatically providing being absent user intervention;

providing, by the recovery unit, a software component requested by the device, the device requesting the software component subsequent to installation of an initial software configuration of the device;

automatically tracking by the recovery unit, in response to the providing, information relating to the provided software component, said automatically tracking being absent user request and user intervention;

automatically determining, by the recovery unit, that the software configuration of the device is to be restored;

responsive to the automatically determining, automatically providing to the device by the recovery unit, based on the tracked information and the identifier, one or more software components usable in restoring the software configuration, the one or more software components including the requested software component; and wherein the providing the software component requested by the device comprises automatically determining by the recovery unit an appropriate version of the software component to be provided, said automatically determining the appropriate version comprising taking into consideration at least one of the software configuration and a hardware configuration of the device.

38. The at least one program storage device of claim 37, wherein the automatically providing the one or more software components comprises automatically determining based on the tracked information and the identifier an appropriate version of the one or more software components to be used in restoring the software configuration.

39. The at least one program storage device of claim 38, wherein said method further comprises providing the original configuration of the device.

* * * * *